United States Patent Office 3,149,085
Patented Sept. 15, 1964

3,149,085
METHOD OF MAKING SYNTHETIC RESIN FROM LIGNIN AND AN EPOXIDE AND RESULTING PRODUCT
Frank J. Ball, Walter K. Dougherty, and Howard H. Moorer, Jr., Charleston, S.C., assignors to West Virginia Pulp and Paper Company, New York, N.Y., a corporation of Delaware
No Drawing. Filed Oct. 20, 1958, Ser. No. 768,073
15 Claims. (Cl. 260—17.5)

This invention relates to resins and relates more particularly to synthetic resins produced by chemical reaction between molecularly less complex substances.

This invention is concerned more especially with the production of such resinous reaction products utilizing lignin recovered from natural ligno-cellulose material.

In obtaining free cellulose fiber from natural ligno-cellulose material the ligno-cellulose material ordinarily is subjected to treatment whereby the lignin content is solubilized sufficiently to permit the formation of an aqueous slurry from which the fibers may be separated. The dissolved lignin, which is in the neighborhood of 25% of the natural ligno-cellulose, is contained in the solution from which the fibers are separated and finds such limited commercial application that almost all lignin solutions are either sewered or disposed of by partial evaporation of the water content and spraying the resulting concentrate into a furnace wherein the lignin is burned and from which the inorganic treating chemicals used in the pulping operation may be at least partially recovered. When lignin is recovered from a pulping operation in dry condition it generally is in the form of an amorphous brown powder and may be purchased from producers at a cost of only a few cents per pound.

The limited commercial utilization of lignin is occasioned principally by reason of its physical and chemical characteristics. Thus lignin is not resistant to water and is soluble in alkaline solutions. Moreover, it is a non-thermosetting thermoplastic which tends to disintegrate if heated above about 200° C. and which, if formable at all from the amorphous powdered condition as recovered, merely provides a crumbly mass having little or no strength.

According to the present invention, lignin has been successfully brought into resin-forming reaction with oxirane epoxides and more particularly with poly-oxirane epoxides, namely, epoxides which contain a plurality of oxirane groups and which, therefore, provide the epoxy resin intermediates from which cured epoxy resins are produced. More is involved than mere blending of lignin with a poly-oxirane epoxide, for according to the present invention a chemical linkage is produced between the lignin and the poly-oxirane epoxide whereby the lignin molecule in effect becomes a part of the larger molecular structure of the new resin product. The resulting new resin has been found to possess a high combination of properties wholly unlike those of the lignin as such that enters into the resin-forming reaction, and preferred embodiments of the new resin of this invention possess properties comparable to, and in some respects superior to, those of epoxy resins as such.

Lignin as it occurs in natural ligno-cellulose material is a complex substance in the nature of a non-uniform polymeric structure in which the basic molecular configuration is believed to be derived from coniferyl-type alcohols with the creation of repeating propyl phenol units. The exact structure of lignin, however, is uncertain. A vast amount of research work has been accomplished to determine the structure, but to date no structure has yet been set forth which satisfactorily explains all the chemical and physical characteristics of lignin. The presence of ether linkages within the structure and the presence of benzene rings, methoxyl groups, and both alcoholic and phenolic hydroxyls has, however, been well established. From our work it appears that a carboxyl group is also present in the lignin molecule, although the presence of this carboxyl group has not been generally established. The presence of a carboxyl group per 1000 molecular weight of lignin greatly aids in explaining the characteristics which lignin exhibits with oxirane epoxide compounds.

The lignin as it occurs in nature is generally termed "proto-lignin" and varies somewhat depending on the particular source of ligno-cellulose material. The principal variation in lignin, depending on its source, appears to be the number of methoxy groups present in the molecule. Thus it has been estimated that hardwood lignin contains about 20% to 21% by weight of methoxy groups, that lignin from soft woods contains about 14% to 15% of methoxy groups and that lignin from grasses contains only about 0 to 1% of methoxy groups. However, the methoxy groups contained in lignin are substantially non-reactive and such differences in the content of methoxy groups are not regarded as having substantial importance in connection with the practice of the present invention.

When the proto-lignin content in naturally occurring ligno-cellulose material is separated from the cellulose fiber and later is recovered, the naturally occurring proto-lignin is affected by the recovery process, with the result that the lignin which is ordinarily referred to in the art when this term is used is the recovered lignin rather than the proto-lignin occurring in the natural ligno-cellulose material. In the practice of this invention it is the recovered lignin which is employed and which is referred to herein. Due to the greater complexity and reduced solubility of the naturally occurring proto-lignin it would not lend itself for use in the production of resins according to the present invention.

The lignin which is preferably employed in the practice of this invention is the lignin generally termed "alkali lignin," which is produced as a by-product of alkaline pulping using either the soda process wherein the pulping liquor contains sodium hydroxide or the sulfate process wherein the pulping liquor contains both sodium hydroxide and sodium sulfide. During either pulping process the lignin is dissolved in the pulping liquor as a salt of lignin and is conventionally recovered from the pulping liquor by acid precipitation. The lignin can be recovered from such acid precipitation as free lignin or as a lignin salt dependent upon the specific conditions under which the lignin is obtained. If the lignin is precipitated at a high pH, generally about 9.5 to 10.0, the salt of lignin is obtained while if the lignin is precipitated at a low pH, generally about 2.0 to 5.0, or if the lignin precipitated at a high pH is acid washed so as to substantially free the lignin from its salt, free lignin is obtained. From the work which we have done it has been found that lignin which is initially precipitated by acid addition to the pulping liquor but which is still as the alkaline salt is not suitable for use according to this invention. We have found that lignin which has been freed from the alkaline salt acquires the capacity of going into mutual solution with epoxide compounds used as the intermediates in the manufacture of epoxy resins. Lignins of slightly different characteristics can be obtained dependent upon the pH at which the lignin is precipitated from the pulping liquor. Thus a pulping liquor of pH 12.5 can be acidified to a pH of 10.0 where a fraction of the lignin will be precipitated. If the precipitated lignin is removed and the pH of the pulping liquor further acidified to a pH of, say, 9.0, another fraction will be precipitated. This process can be continued until all the lignin has been precipitated at a very low pH. The different fractions of lignin thus obtained when in or converted to the free lignin form possess slightly different characteristics, such as solubilities in certain solvents, due, it is believed, to lignin of slightly different molecular weights precipitating at the different pH levels. In the practice of this invention all these fractions of lignins are usable as long as the lignin is in the free lignin form.

The mutual solution of lignin and epoxy resin intermediates may be that resulting from merely commingling the recovered lignin with the epoxy resin intermediate, the rapidity of solution being promoted when desired by heating depending principally upon the viscosity and molecular weight characteristics of the epoxy resin intermediate. However, the occurrence of a mutual solution may also be produced in the presence of a volatile or non-volatile common solvent for the lignin and the epoxy resin intermediate. Most solvents of the epoxy resin intermediates have been found to be also good solvents for the lignin as are the commonly used curing agents such as amines and organic dibasic and polybasic acids and acid anhydrides. With or without a solvent the epoxy resin intermediate and curing agents when present, with the exception of certain amines, act as solvents for the lignin in enabling it to go into solution at temperatures at which the lignin is stable. By employment of a common solvent or combination of solvents, dissolution of the lignin may be effected at still lower temperatures.

An apparently critical factor in the development of chemical linkage by reaction between the lignin and the epoxy resin intermediate is that of molecular contiguousness which is obtained by the mutual solution of the lignin and oxirane groups of the epoxy resin intermediate. Such chemical linkage may occur directly between the lignin and the poly-oxirane epoxide or indirectly, as will be described more in detail hereinbelow, by mutual reaction with a polyfunctional curing agent which is comprised in the mutual solution of the lignin and the poly-oxirane epoxide.

Epoxy resins have come into extensive use in recent years due to the high combination of physical and physico-chemical properties which they exhibit. Some of these properties relate to their strength and toughness, their resistance to water, acid and alkalies and their capacity to adhere and bond to a remarkable variety of materials. Other advantages exhibited by the epoxy resins result from the fact that the epoxy resin intermediates may be supplied in various physical forms ranging from viscous liquid to solid. Moreover, certain of the intermediates may be cured at relatively low temperature and have the advantage of curing with low shrinkage and without the development of undesired reaction products such as water or a gas. As the result of the unusual combination of properties exhibited by epoxy resins, they have gone into very large use notwithstanding that at least up until the present time they have been available only at prices considerably greater than those of many other commercially produced synthetic resins. The costliness of epoxy resins cannot be reduced by use of increased proportions of a curing agent without adversely affecting the properties for which the epoxy resins are desired.

Epoxy resins are produced from epoxy resin intermediates by chemical reaction wherein the oxirane groups of the intermediate open up with formation by chemical reaction of chemical linkages either directly or by common reaction with a curing agent. The intermediates most generally used in the manufacture of epoxy resin are those derived by reaction between bisphenol A and epichlorohydrin, the reaction product in its most elemental form being diglycidyl ether of bisphenol A which generally is represented as having the following formula:

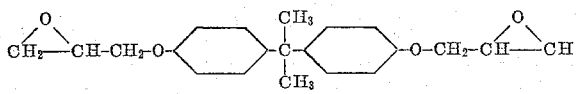

The diglycidyl ether of bisphenol A contains two oxirane groups or rings which are characterized by the ring structure

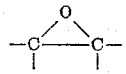

The oxirane group also is referred to as the alpha epoxy group or ring and as the 1,2 epoxy group or ring. The expression "epoxy" from the standpoint of abstract chemistry is not usually limited to the oxirane group or ring and the synonymous terms "orixane," "1,2 epoxy" and "alpha epoxy" are used to distinguish this group or ring from other groups or rings. However, in the resin art and in connection with epoxy resin intermediates the expression "epoxy" is limited to the oxirane group or ring both from the standpoint of nomenclature used in the art and from the standpoint of reactivity in the production of what are known as "epoxy resins." Herein and in the claims the expression "epoxy" is used according to the practice in the resin art, namely, to mean the oxirane group or ring. Similarly, the expressions "epoxide" and "epoxide compound" are used to mean a compound containing one or more oxirane groups. The expression "polyepoxide" is used to means an epoxide containing two or more oxirane groups. The diglycidyl ether of bisphenol A contains two alpha epoxy groups or rings which are characterized by the oxirane group or ring

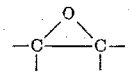

The alpha epoxy group also is commonly referred to as the 1,2 epoxy group or ring. The expression "epoxy" from the standpoint of abstract chemistry is not usually limited to the alpha epoxy group or ring and the synonymous terms "alpha epoxy," "1,2 epoxy" and "oxirane" are used to distinguish this group or ring from other epoxy groups or rings. However, in the resin art and in connection with epoxy resin intermediates the expression "epoxy" is limited to the alpha epoxy group or ring both from the standpoint of the nomenclature used in the art and from the standpoint of reactivity in the production of what are known as "epoxy resins." Herein and in the claims the expression "epoxy" is used according to the practice in the resin art, namely, to mean the alpha epoxy group or ring. Similarly, the expressions "epoxide" and "epoxide compound" are used to mean a compound containing one or more alpha epoxy groups. The expression "polyepoxide" is used to mean an epoxide containing two or more alpha epoxy groups.

For the sake of specificity in the claims, the term "oxirane" is employed with reference to a compound containing one or more oxirane groups; and the term "poly-oxirane epoxide" is used in reference to a compound containing a plurality of oxirane groups.

By control as to the extent of the reaction and partial interpolymerization and selection of the monomers, the molecular weight of epoxy resin intermediates may vary from about 40 to 7,000, the molecular weight generally being between 300 and 4,000. These intermediates are suitable for various commercial applications, depending on their consistencies, their reactive properties and the properties of the cured resin. In addition to the diglycidyl ether of bisphenol type, other poly-oxirane epoxide compounds may be employed as epoxy resins, such compounds generally being produced by the reaction of epichlorohydrin with a polyhydroxy compound such as glycerol; ethylene glycol; diethylene glycol; resorcinol; 1,3,5 hydroxy benzene; 1,5 dihydroxy naphthalene; and 2,2,5,5-tetrakis (4 - hydroxy phenol) hexane. Poly-oxirane epoxides may also be prepared from compounds such as dicyclopentadiene. Such intermediates which have the capacity of undergoing chemical reaction wherein the oxirane groups become opened with the development of linkages either directly or indirectly between the oxirane groups are referred to herein as "epoxy resin intermediates." Polyfunctional curing agents such as dicarboxylic acids or an amine are conventionally used in curing the epoxy resins, although such curing may also be effected under the influence of a catalyst which induces development of ether linkages between epoxy groups.

In the practice of this invention it is not essential to employ a poly-oxirane epoxide inasmuch as the reaction is essentially that which results from the development of a linkage by chemical reaction between lignin and an oxirane group of an epoxide compound. Thus by the development of such a linkage the development of a larger molecular structure may be accomplished even though an epoxide is used which contains only a single oxirane group. However, it is normally much preferable in the practice of this invention to employ a poly-oxirane epoxide, i.e., epoxy resin intermediates, of the kinds exemplified above whereby development of further linkages with lignin molecules is permitted with accompanying development of much larger molecular structures. The poly-oxirane epoxides conventionally used as the intermediates in the commercial manufacture of epoxy resins are well suited for use in the practice of this invention.

The development of the chemical linkage between the lignin and the oxirane epoxide compound may be accomplished in different ways according to this invention. The general nature of the reaction whereby the chemical linkage is accomplished is that whereby a hydrogen atom of a radical in chemical combination with the lignin by virtue of said radical being comprised in said lignin or having been chemically added thereto reacts with an oxirane group of an oxirane epoxide with the production of a chemical linkage between the radical and the oxirane epoxide. Provided the lignin and the oxirane epoxide are in mutual solution, a direct linkage may be accomplished by the reaction of a hydrogen atom of a hydroxyl radical of the lignin with an oxirane group of the epoxide with the production of an ether linkage. Similarly, the hydrogen atom of a carboxyl group comprised in the lignin may react directly with an oxirane group of the epoxide with the development of an ester linkage. In such reactions the lignin may be regarded as acting as its own curing agent for effecting a condensation and polymerization reaction with an epoxy resin intermediate (polyoxirane epoxide). On the other hand, the epoxy resin intermediate may be regarded as a vehicle whereby the normally non-interreactive molecules of lignin may be caused to become chemically interlinked with each other via the polyoxirane epoxide molecule to produce a complex resinous molecule. However, the reaction pattern may likewise involve an initial breaking of the oxirane group by a curing agent with transitory freeing of an oxygen atom of the oxirane group for reaction with an acidic group of the lignin. After the mutual solution has been effected between the lignin and the epoxy resin intermediate, curing may be accelerated by heat.

While such direct linkage between the lignin and the poly-oxirane epoxide may be accomplished as substantially the sole resinifying reaction, the chemical cross-linkage whereby the resinifying condensation reaction takes place may be accomplished more readily by the employment of a polyfunctional curing agent such as a dicarboxylic acid, e.g., phthalic acid, preferably as the anhydride. In such case when the lignin, the epoxy resin intermediate and the phthalic acid are in mutual solution the affinities are such that instead of the epoxy resin curing substantially entirely by itself, leaving the lignin as it was, the dicarboxyllic acid curing agent likewise reacts with the hydroxyl functions of the lignin so as to become chemically combined with the lignin as a partial ester wherein the hydrogen atom of the residual carboxyl is reactive with the oxirane group contained in the epoxy resin intermediate, thereby effecting a chemical linkage through the dicarboxylic acid residue between the lignin and the epoxy resin intermediate. While there is not believed to be any set pattern for the development of the chemical linkages, nevertheless the curing agent is believed to enter into the reaction so as to become a part of the resin reaction product. Other polyfunctional curing agents also may be employed such as polyamines. Some amines, tertiary amines, functioning more in the nature of a catalyst than as a curing agent.

Various formulations and manners of processing may be employed for bringing about the mutual solution of the lignin and the poly-oxirane epoxide and the development of chemical linkage between them for the production of new resins according to this invention. Some of these formulations and manners of processing have been illustrated in connection with the examples set forth hereinbelow, the stated parts being by weight:

*Example 1*

A resin casting was produced by heating 50 grams of an epoxy intermediate of the diglycidyl ether of bisphenol type having an average molecular weight of the order of 350–400 (hereinafter the epoxy intermediates referred to in the examples are of the diglycidyl ether of bisphenol type unless otherwise stated) to 190° C. and 17.5 grams of lignin (unless otherwise stated the reference is to alkali lignin in free lignin form) was added and dissolved. The resulting solution was cooled to 120° C. and 33 grams of phthalic anhydride were added. The temperature was then raised to 130° C. to assure solution of the phthalic anhydride in the lignin-epoxy solution. The overall composition of this solution was:

| | Parts |
|---|---|
| Epoxide | 49.5 |
| Phthalic anhydride | 32.7 |
| Lignin | 17.3 |

The solution was poured into molds which were heated to 160° C. and kept at that temperature for 45 minutes, by which time an initial curing had occurred. The initially cured resin was removed from the molds after cooling and then subjected to a temperature of 136° C. for sixty hours to attain a final curing.

For comparison, a conventional epoxy resin casting was prepared using the same epoxy resin intermediate and the phthalic anhydride, the composition being:

| | Parts |
|---|---|
| Epoxide | 60 |
| Phthalic anhydride | 39.8 |
| Accelerator (polyamine) | 0.4 |

The phthalic anhydride and accelerator were dissolved in the epoxide and the resulting solution was poured into molds and cured at 160° C. for 45 minutes followed by heating at 110° C. for 20 hours.

The following properties were determined for the aforesaid lignin-epoxy and epoxy resin respectively from several different batches prepared according to the above.

| Property | | Lignin-Epoxy Resin | Epoxy Resin |
|---|---|---|---|
| Flexural Strength | p.s.i. | 13,500 | 12,500 |
| Impact Strength | | 0.466 | 0.571 |
| Acid-Resistance | percent | 0.0214 | 0.0140 |
| Alkali-Resistance | do | 0.0102 | 0.0160 |
| Water-Resistance | do | 0.040 | 0.0280 |
| Shrinkage: | | | |
|   Length | do | 1.48 | 2.52 |
|   Width | do | 2.20 | 2.93 |
| Electrical Properties: | | | |
|   Dielectric Constant | | 4.50 | 4.18 |
|   Dissipation Factor | | 0.144 | 0.119 |
|   Power Factor | | 0.143 | 0.118 |
|   Loss Factor | | 0.648 | 0.497 |
| Heat Distortion Temperature | ° C. | >170 | >170 |

The flexural strength values referred to in the foregoing table and elsewhere herein were determined in accordance with the A.S.T.M. specification #D790–49T, except that the samples employed in testing measured 5" x ½" x ½" and that a 3" span was employed. The values are calculated to pounds per square inch.

The impact strength is in foot pounds per inch of width obtained by testing according to A.S.T.M. specification D256–54T Method A except that test specimens were not conditioned according to A.S.T.M. specification D618–54 prior to testing. The test samples were substantially .4″ thick at the cut and were substantially ½″ in width.

The acid-resistance was determined by conditioning a sample measuring 1″ x 1″ x 1″ at 73° F. for at least 72 hours and then soaking the samples in a 30% solution of sulphuric acid for forty-eight hours at 23° C. The gain in weight as compared with the dry weight was measured and the percent gain in weight was calculated.

The alkali-resistance was determined similarly to the acid-resistance, except that a 10% solution of sodium hydroxide was used.

The water-resistance value was determined similarly to the acid- and alkali-resistance, except that distilled water was used, and the exposure time was only twenty-four hours.

The shrinkage value was determined by measuring the cast piece after curing in relation to the dimensions of the mold. The mold employed was approximately 5″ in length and approximately ½″ x ½″ square, the mold ends being rounded in one direction. The percent shrinkage was determined as the ratio of the difference between the mold dimension and the dimension of the piece divided by the dimension of the mold.

The electrical properties were determined according to A.S.T.N. specification D150–54I using cast plates having the following thickness.

| | Inches |
|---|---|
| Lignin-epoxy resin | 0.451 |
| Epoxy resin | 0.415 |

A frequency of 60 cycles per second was used for these tests.

The heat distortion temperature was determined according to A.S.T.M. specification D648–45T using 5″ x ½″ x ½″ bars. However, limitations of equipment did not permit testing above 170° C. At that temperature the deflection of the lignin-epoxy bar was 0.003 inch.

It is noteworthy in connection with the foregoing data that the lignin-epoxy resin exhibits a very high order of combined properties comparable to those of the epoxy resin, some of the properties even being superior to those of the cured epoxy resin. The properties and characteristics of the lignin as such have essentially given way to the attainment of a new and high order of properties exhibited by the new resin product. Notwithstanding the presence of 17.3% of lignin which as such is an amorphous material exhibiting little or no strength, the new lignin-epoxy resin exhibits similar flexural strength as compared with the epoxy resin without the lignin. While the impact strength of the new resin is slightly lower than that of the straight epoxy resin, the difference is not great and for uses where high impact values are desired a suitable flexibilizer may be employed to provide enhanced impact strength.

The resistance of the new lignin-epoxy resin to alkali and to water is particularly noteworthy. Lignin as such is readily soluble in alkali and exhibits low water-resistance. More generally, the experience of the art in connection with compounds containing hydroxyls as, for example, cellulosic materials, has been that the presence of the hydroxyl is inconsistent with attaining good water-resistance. Moreover, a compound which contains a carboxyl group may be expected to exhibit relatively low resistance to alkali. However, the new lignin-epoxy resin exhibited extremely high alkali-resistance and water-resistance, being comparable to the extraordinary properties of epoxy resins in this regard. Likewise, the new lignin-epoxy resin exhibited extremely high resistance to acid, being similar to the epoxy resin in this respect also.

Another noteworthy property of the new lignin-epoxy resin is that it has extremely low shrinkage upon casting. In fact, the new lignin-epoxy resin exhibited less shrinkage than the straight epoxy resin used as a control.

Another valuable property of the new lignin-epoxy resin lies in its dielectric and related properties, which make it of great value for use in the manufacture of electrical equipment. The capacity to resist high temperature with very little distortion likewise is a valuable property. The foregoing properties are such that the new resin of this invention has wide utility, e.g., in fields such as casting, encapsulating, molding, impregnation, and the like.

The following additional castings have been prepared in accordance with this invention using variations from the formulations of Example 1.

Examples 2–6 below are illustrative of the employment of different relative proportions of lignin, epoxy resin intermediate and phthalic anhydride. In each of the examples in this group the average molecular weight of the epoxy resin intermediate was of the order of 350–400 and the lignin was as free lignin.

*Example 2*

| | Parts |
|---|---|
| Lignin | 8.3 |
| Epoxide | 55 |
| Phthalic anhydride | 36.2 |
| Accelerator (polyamino) | 0.5 |

The accelerator was a polyamine commonly used as an accelerator in curing epoxy resins. The casting was prepared as in Example 1 and cured at 160° C. for 45 minutes and 110° C. for 20 hours. Flexural strength was 9,401 p.s.i. and the impact strength was 0.489 ft. pounds per inch. Water resistance was 0.0446%.

*Example 3*

| | Parts |
|---|---|
| Lignin | 22.4 |
| Epoxide | 46.3 |
| Phthalic anhydride | 30.6 |

The casting was prepared as in Example 1 and cured at 160° C. for 45 minutes and 108° C. for 64 hours. Flexural strength was 8,910 p.s.i. and the impact strength was 0.393 ft. pounds per inch. Water resistance was 0.0552%.

*Example 4*

| | Parts |
|---|---|
| Lignin | 23.4 |
| Epoxide | 66.7 |
| Phthalic anhydride | 10 |

The casting was prepared as in Example 1 and cured at 160° C. for 45 minutes and 136° C. for 48 hours. Flexural strength was 5,700 p.s.i. and impact strength was 0.215 ft. pounds per inch indicating less curing than in the preceding examples due to the lesser amount of curing agent. Water resistance was 0.0448%.

*Example 5*

| | Parts |
|---|---|
| Lignin | 18.8 |
| Epoxide | 37.6 |
| Phthalic anhydride | 43.3 |

The casting was prepared as in Example 1 and cured at 149° C. for 45 minutes and 106° C. for 18 hours. Flexural strength was 13,600 p.s.i. and impact strength was 0.354 ft. pounds per inch. Water resistance was 0.0414%. This example indicates the desirability, when phthalic anhydride is used as a curing agent, of having a sufficient amount thereof present for reaction of the carboxyl groups with both the oxirane groups of the epoxide and the hydroxyl groups of the lignin. This example also illustrates the savings in material cost which may be realized according to this invention. Thus the lignin used is available at little more than the price of a waste product while phthalic anhydride is a widely used resin component that is available at low cost, with the result that the new resin of this invention, having a very high order of properties, may be produced at very greatly reduced cost as compared with the present cost of epoxy resins.

Example 6

| | Parts |
|---|---|
| Lignin | 25.8 |
| Epoxide | 34.5 |
| Phthalic anhydride | 40 |

The casting was prepared as in Example 1 and cured at 149° C. for 45 minutes and 106° C. for 18 hours. Flexural strength was 12,860 p.s.i. and impact strength was 0.417 ft. pounds per inch. Water resistance was 0.0484%.

While phthalic anhydride may advantageously be used as a curing agent, other anhydrides have been employed, as illustrated by Examples 7, 8 and 9, the lignin and the epoxide being the same as in the prior examples.

Example 7

| | Parts |
|---|---|
| Lignin | 16.7 |
| Epoxide | 47.5 |
| Hexahydro phthalic anhydride | 35.7 |

The casting was prepared as in Example 1 and cured at 149° C. for 20 minutes and 106° C. for 17 hours. Flexural strength was 12,300 p.s.i. and impact strength was 0.527 ft. pounds per inch. Water resistance was 0.0491%.

Example 8

| | Parts |
|---|---|
| Lignin | 13.7 |
| Epoxide | 39.2 |
| Dodecenyl succinic anhydride | 47.1 |

The casting was prepared as in Example 1 and cured at 107° C. for 21 hours. Flexural strength was 10,180 p.s.i. and impact strength was 0.299 ft. pounds per inch. Water resistance was 0.0590%.

Example 9

| | Parts |
|---|---|
| Lignin | 16.2 |
| Epoxide | 46.2 |
| Methyl nadic anhydride | 37.0 |
| Accelerator (of the poly amine type) | 0.5 |

The casting was prepared as in Example 1 and cured at 149° C. for 45 minutes and 106° C. for 18 hours. Flexural strength was 13,900 p.s.i. and impact strength was 0.343 ft. pounds per inch. Water resistance was 0.0581%.

When a di- or other polycarboxylic acid curing agent is employed, it preferably is used in the form of an anhydride since water is not formed as a reaction product when the anhydride is used. However, the acid also functions as a curing agent and when reference is made herein and in the claims to the polycarboxylic acid it is to be understood that the anhydride likewise is included in the term. When the anhydride is used the alcoholic hydroxyl of the lignin molecule promotes the institutuion of the condensation reaction. As indicated by the examples given, the polycarboxylic acid or its anhydride may be aromatic, aliphatic or heterocyclic. Other examples are tetrachlorophthalic anhydrides, pyromellitic dianhydride and maleic anhydride.

In Examples 10, 11 and 12 varying amounts of an accelerator were employed instead of a polycarboxylic acid curing agent, the lignin and the epoxide being the same as in the prior examples.

Example 10

| | Parts |
|---|---|
| Lignin | 25.7 |
| Epoxide | 73.5 |
| Accelerator (N,N-dimethyl benzyl amine) | .7 |

The casting was prepared as in Example 1 and cured at 160° C. for 45 minutes and 136° C. for 50 hours. Flexural strength was 5,420 p.s.i. and impact strength was 0.289 ft. pounds per inch. Water resistance was 0.0930.

Example 11

| | Parts |
|---|---|
| Lignin | 32.6 |
| Epoxide (diglycidyl ether of glycerol; avg. mol. wgt. approx. 300) | 65.3 |
| Accelerator (pyridine) | 2 |

The casting was prepared as in Example 1 and cured at 105° C. for 240 minutes. Flexural strength was 10,580 p.s.i. and impact strength was 0.822 ft. pounds per inch. Sample disintegrated in water.

Example 12

| | Parts |
|---|---|
| Lignin | 26.2 |
| Epoxide (diglycidyl ether of glycerol avg. mol. wgt. approx. 300) | 63 |
| Accelerator (piperidine) | 4.8 |

The casting was prepared as in Example 1 and cured at 105° C. for 180 minutes. Flexural strength was 12,050 p.s.i. and impact strength was 1.050 ft. pounds per inch. Sample disintegrated in water.

In the foregoing examples the epoxy resin intermediate used was, as aforesaid, one having an average molecular weight of the order of 350–400. That other epoxy resin intermediates react similarly, is evidenced by Examples 13 and 14 which follow.

Example 13

| | Parts |
|---|---|
| Lignin | 23.2 |
| Epoxide (diglycidyl ether of glycerol average molecular wgt. about 300) | 46.4 |
| Phthalic anhydride | 30.6 |

The casting was prepared as in Example 1 and cured at 160° C. for 45 minutes and 108° C. for 20 hours. Flexural strength was 14,150 p.s.i.

Example 14

| | Parts |
|---|---|
| Lignin | 17.5 |
| Epoxide (diglycidyl ether of glycerol average molecular wgt. about 300) | 25 |
| Epoxide (average molecular wgt. about 350–400) | 25 |
| Phthalic anhydride | 33 |

The casting was prepared as in Example 1 and cured at 160° C. for 45 minutes and 108° C. for 64 hours. Flexural strength was 12,100 p.s.i. and impact strength was 0.496 ft. pounds per inch of width.

In connection with Examples 13 and 14, it may be mentioned that the consistency of the epoxy resin intermediate increases with molecular weight. The lower molecular weight intermediates are quite fluid at normal temperature, whereas heating is required to impart fluidity to intermediates of higher molecular weight. The mutual solubility of lignin and the epoxy resin intermediate decreases somewhat with increase of the molecular weight of the epoxy resin intermediate. However, when the presence of a solvent is permitted such solubility is enhanced by the presence of solvent either of the volatile type such as acetone or a relatively high boiling solvent such as Cellosolve (monoethyl ether of glycol), or even a curing agent such as phthalic anhydride. When the curing agent is used as the solvent, best results can be obtained by first dissolving the lignin in the curing agent, and adding the epoxide. For example, 5 grams of free alkali lignin were dissolved in 9 grams of phthalic anhydride at 130° C. To this was added 20 grams of an epoxy resin intermediate having an average molecular weight between 1000 and 1200 which dissolved in the lignin phthalic anhydride solution. When the lignin goes into mutual solution with the epoxy resin intermediate, there is some increase in viscosity as compared with the epoxy resin intermediate as such, and for this reason when a given viscosity is desired an epoxy resin intermediate is employed of a somewhat lower viscosity so that the mutual solution will have the viscosity desired. Moreover, while the compositions are thermosetting, in the intermediate stage, they are thermoplastic and desired viscosity characteristics can be imparted by control of temperature as well as composition. Moreover, as aforesaid, viscosity characteristics likewise can be controlled by the presence of common solvents where the presence of such solvent is permitted. By employment of a reactive solvent such as allyl glycidyl ether a lower initial viscosity may be obtained and since the solvent becomes part of the resinous reaction product, there is no solvent as such present after curing has been effected. Preferably an epoxy resin intermediate or other polyoxirane compound is employed having an average molecular weight between about 80 and 700 for the reasons of solubility above mentioned and likewise because of the greater number of epoxy groups per unit weight of epoxide and the correspondingly greater capacity per unit weight for reaction with the lignin. This feature is especially desirable in forming high molecular weight resins and resin intermediates for use in such fields as laminates and coating. However, to the extent that lignin is soluble in epoxy resin intermediates having average molecular weights of the order hereinabove mentioned and a reaction occurs linking the lignin with an oxirane group of the epoxide compound, the resulting formation of a lignin-epoxy resin is within the scope of this invention.

The following example exemplifies the employment of an amine curing agent:

Example 15

100 grams of epoxy resin intermediate (diglycidyl ether of glycerol) having a molecular weight of about 300 were heated to 150° C. with 25 grams of free alkali lignin until the epoxide and the lignin went into mutual solution and maintained at that temperature for approximately 10 minutes to permit reaction of the lignin and epoxide to occur. The solution then was cooled and 20 grams of an amine curing agent was added at substantially room temperature. The curing agent that was used is one that is commonly used for curing epoxy resins and is sold under the designation Epon Curing Agent T–1. It is believed to be a polyamine. Upon the addition of the curing agent an exothermic reaction ensued during which the mass became thermoset. The mass was cooled to room temperature and placed in an oven at 107° C. and kept at this temperature for twenty hours. The set composition was then cooled to room temperature and left for five hours prior to testing. The casting exhibited flexural strength of 10,790 p.s.i.

When certain amines are added to a lignin-epoxy resin intermediate solution in concentrations sufficient to effect curing (above approximately 10 parts per hundred of the epoxy resin intermediate) it has been found that a precipitate is formed which is believed to be a lignin amine salt. Although under these conditions a cure is obtained, the cured piece is of non-homogenous nature and would therefore not generally be satisfactory for most purposes. This problem, however, can be eliminated by allowing the lignin to react with the epoxy resin intermediate, tying up the acidic groups of the lignin and preventing the formation of the amine salt and the difficulties encountered therewith. This also insures the chemical combining of the lignin with the epoxide in the finally cured resin. As the reaction of lignin with the epoxy resin intermediate will continue until gellation and curing occurs, it is necessary when using amine curing agents that the reaction be stopped before these conditions occur. This procedure of allowing reaction of the lignin and epoxy resin intermediate to occur prior to addition of the curing agent, may also be used with curing agents other than the amines.

The lignin epoxy resin of this invention may be used in obtaining extremely high adhesive bonding, as evidenced by the following example:

Example 16

90 grams of epoxy resin intermediate having an average molecular weight of the order of 340–400 (according to the manufacturer some reactive diluent is present), was heated with 10 grams of lignin at 100° C. until mutual solution was obtained. The resulting solution was cooled to room temperature and, being of fluid consistency, was readily blended with 13.5 grams of N,N-dimethyl benzyl amine as a curing agent. The liquid was applied to ½″ wide strips of galvanized steel which were placed face to face with the adhesive therebetween throughout a ¼″ overlap of the strips. The strips were placed in a clamp under pressure and were cured at 100° C. for sixteen hours. The test specimens were then cooled to room temperature and after five hours at room temperature were subjected to test for determining shear strength. Of the three samples prepared, the metal ruptured in one sample during test prior to rupture of the adhesive bond. In the case of the other two examples the average shear strength for rupturing the bond between the metal strips was 1,805 pounds per square inch of adhesive lap. For comparison, 100 grams of the same epoxy resin intermediate were mixed with 15 grams of the same amine curing agent and three samples were prepared as hereinabove described. The average shear strength of the three samples, using the straight epoxy resin, was 1,743 pounds per square inch.

The lignin epoxide resin in this example was also applied to samples of fiber board using a ¼ inch overlap. During testing the board in all cases failed before any effect was noticed at the glue line.

The new lignin-epoxy resins of this invention likewise result in laminates having extremely high properties as illustrated by the following examples, Examples 17 and 18 illustrating wet lay-up.

Example 17

200 grams of epoxy resin intermediate having average molecular weight of about 300 was heated to 115° C. with 50 grams of lignin and 90 grams of phthalic anhydride was added to form a mutual solution of the ingredients. The solution was then cooled to approximately 50° C., at which temperature the solution was of suitable fluid consistency for impregnating a paper sheet by dipping. A kraft paper was employed weighing about 92# per 3000 sq. ft. Strips of the paper were dipped in the solution, the solution was distributed uniformly and excess solution was removed prior to stacking. Eight of the stacked sheets were placed between the platens of a press, aluminum foil being employed to prevent adhesion of the sheets to the platens. The platens were maintained at substantially 350° F. and were initially closed for fifteen minutes to accomplish initial setting. The platens were then opened for 10 seconds and then closed again to permit curing at a pressure of the order of 600–650 p.s.i. for fifteen minutes. The pieces were then removed from the press and cured at 105° C. for sixteen hours.

In the resulting laminate the lignin-epoxy resin constituted 44.4% of the total weight and the sample exhibited a flexural strength of 14,722 p.s.i.

In testing the laminates specimens were used ½″ wide and the distance between the supports was 1½″. The flexural strength determination otherwise was the same as that referred to hereinabove in connection with the castings.

Example 18

Example 17 was repeated except that the formulation was 200 grams of epoxy resin intermediate, 50 grams of lignin and 90 grams of phthalic anhydride with the production of laminate samples containing six paper sheets, the total resin content being 56.7%. The laminate samples produced according to this example exhibited flexural strength of 18,950 p.s.i.

For comparison with Examples 17 and 18 a control sample was prepared using epoxide resin. In this control sample 100 grams of the epoxy resin intermediate having an average molecular weight of about 300 was used in combination with 45 grams of phthalic anhydride as a curing agent. This mixture was heated to 110°–120° C. and then permitted to be cooled to warm condition suitable for application. The same paper and coating and press techniques were employed as in Examples 17 and 18. The sample contained six sheets of paper and 45% by weight of the epoxy resin. Samples of the laminate so produced exhibited an average flexural strength of 12,626 p.s.i. of cross-sectional area.

The following examples illustrate the preparation of laminates utilizing a dry lay-up technique.

Example 19

20 grams of acetone were added to 200 grams of epoxy resin intermediate having an average molecular weight between 350 and 400 to produce a mutual solution. 50 grams of free alkali lignin were added and the mixture was heated to about 70° C. at which temperature 90 grams of phthalic anhydride were added, the resulting mixture then being heated to about 105° C. to effect complete mutual solution of all of the ingredients. Upon effetcing the mutual solution, the solution was cooled and such acetone as had evaporated was replaced in the mixture plus an additional 40 grams of acetone to reduce the viscosity so as to be suitable for impregnating the paper sheets used in laminating, the paper being the same paper that had been used in preparing the laminates of Examples 17 and 18. Impregnating was effected by dipping the paper sheets and passing them between press rolls to obtain uniform application of the solution. The individual sheets were then permitted to dry by the evaporation of the acetone, leaving the paper sheets impregnated with solid resin. Six sheets so prepared were stacked and subjected to the same press cycle described above in connection with Examples 17 and 18. The resulting laminate, which contained substantially 45.6% of lignin-epoxy resin, exhibited a flexural strength of 18,876 pounds per square inch.

Example 20

200 grams of an epoxy resin intermediate having an average molecular weight of between 350 and 400 was heated to 70° C. at which temperature 50 grams of free alkali lignin was added. The mixture was heated slowly until solution occurred. Heating was continued for approximately 15 minutes during which time the temperature rose to 200° C. The purpose of this prolonged heating was to insure reaction of the lignin with the epoxide. The solution was slowly cooled to 125° C. when 70 g. of Cellosolve was added and then rapidly cooled to 27° C. in an ice water bath. 50 grams of a polyamine (Epon Curing Agent T–1) was added to the solution at room temperature and squares of the paper used in Example 17 were saturated according to the procedures of the foregoing examples. A laminate produced using the press curing cycle of Example 17 except that an initial set was obtained in one minute and a cure temperature of 300° F. was used, had a flexural strength of 21,044 p.s.i. This laminate was soaked in 5% sodium hydroxide solution for twenty-four hours at room temperature, although the sample swelled and softened, moisture pick up was 57.1%, the sample remained intact and did not disintegrate.

A second laminate was made identical with the above except a press cure temperature of 220° F. was used instead of 300° F. Flexural strength of this laminate at a loading of 49.8% resin was 21,520. As with the above laminate 24-hour exposure to 5% NaOH did not disintegrate the sample. Weight gain was 50.0%.

Example 21

5 grams of acetone soluble free alkali lignin (obtained by acetone extraction of lignin) were added to a solution of 10 grams of acetone and 20 grams of an epoxy resin intermediate having an average molecular weight of between 350 and 400. Most of the lignin dissolved at 23° C., however, the temperature was raised to 50° C. to insure complete mutual solution. 3 grams of metaphenylene diamine were added at approximately 40° C. Eight squares of (4" x 4") paper which was used in Example 17 were dipped in the resin and the excess resin removed. The dipped sheets were allowed to remain at room temperature for 16 hours to permit volatilization of the acetone. The dry sheets were stacked and laminated at 300° F. under 690 p.s.i. pressure for 30 minutes. The pressed sheets were given a final cure at 105° C. for 16 hours in an oven. The laminate was cut into strips ½" x 4" and tested for flexural strength. Flexural strength was 29,987 p.s.i. The resin content of the final laminate was 55.4%.

In the production of laminates it is apparent that other sheet materials than paper may be used as, for example, fabrics of woven or unspun fiber made from various fibers such as natural or synthetic organic fibers or mineral fibers such as glass fiber and asbestos. Wood sheets and mica likewise may be laminated.

The following example illustrates the use of fiberglass in laminating.

Example 22

100 grams of epoxy resin intermediate having an average molecular weight between 350 and 400 was heated and 25 grams of alkali lignin being free of any salts were added and dissolved. 45 grams of phthalic anhydride were then added and dissolved to form a mutual solution. The temperature was reduced to approximately 50° C. at which temperature the resin solution was still fluid. Squares of fiberglass woven fabric were saturated with the resin and passed through a press to obtain even distribution of the resin solution. Six squares of the saturated fiberglass were stacked and subjected to the same press cycle described above with Examples 17 and 18. The resulting laminate which contained substantially 54.8% of lignin-epoxy resin exhibited a flexural strength of 51,398, p.s.i.

A control in which 100 grams of the same epoxy resin intermediate and 45 grams of phthalic anhydride were heated until solution occurred and then used for laminating and curing fiberglass woven fabric according to the above procedures yielded a finished laminate having a flexural strength of 51,689 p.s.i. with a resin loading of 51.7%.

The following example illustrates the use of wood flakes in laminating.

Example 23

50 grams of free alkali lignin were added to 200 grams of an epoxy resin intermediate having an average molecular weight between 350 and 400 and slowly heated to 205° C. to permit reaction of the lignin and the epoxy resin intermediate to occur. The temperature was lowered and at approximately 125° C. acetone was added most of which volatilized. The resin was cooled further and additional acetone was added so that a total of 60 grams of acetone were retained with the resin. At 35° C. the viscosity of the resin solution was 100 centipoises. 30 grams of acetone were added to 50 grams of a polyamine (designated Epon curing agent T–1) to reduce its viscosity. The curing agent was mixed with the resin solution giving a solution containing 77% solids. 52 grams of this solution was sprayed on approximately 570 grams of aspen wood flakes. The acetone was allowed to evaporate and the wood flakes were pressed at a pressure of 200 p.s.i. at a temperature of 350° F. for 15 minutes to form a solid board approximately 0.5 inch thick. The modulus of rupture of this board was determined to be 4325 p.s.i.

The lignin-epoxy resins of this invention likewise exhibit a high combination of properties when employed in coatings. They may be used in coatings which either do or do not employ a volatile solvent and in compositions wherein the lignin-epoxy resin is or is not of the type which has been reacted with other materials. Generally speaking, the lignin-epoxy resin of this invention may be used for providing coatings of the same general type as heretofore have been produced using epoxy resin by itself. Thus in the case of a coating of the 100% solids type, the resinous component may be comprised of a mutual solution of lignin in epoxy resin instead of epoxy resin by itself, the curing being promoted by a suitable curing agent of any of the kinds hereinabove referred to. Moreover, similar considerations are applicable in connection with coatings which comprise a volatile solvent such as a ketone, ester or ether. Such coatings may be air-dried or heat-convertible using suitable curing agents as amines or an acidic material such as phosphoric acid or a urea formaldehyde.

For providing greater hydrocarbon solubility, it is preferable that the product of reaction between the lignin and the epoxy resin intermediate comprise the residue of an aliphatic monocarboxylic acid, such as a higher fatty acid containing from about 18 to 26 carbon atoms, which has become linked with the molecular structure of the resin by esterification. Drying oil fatty acids such as oleic, linoleic and linolenic are desirable when dried upon exposure to air or other oxygen-containing atomsphere. When the coating is to be backed or otherwise heat cured other fatty acids may be employed such as palmitic or stearic. The presence of fatty acid residue also tends to promote adhesiveness. On the other hand, an acid such as resin acid tends to promote coating hardness. A suitable source of such acids is tall oil which contains a mixture of aliphatic monocarboxylic acids of the character aforesaid and rosin acid. The monocarboxylic acid residue may be combined by reaction with either an epoxy group of the epoxide or a hydroxyl group of the lignin, or both. While either or both of these reactions may be effected separtely, nevertheless it is perferable to first dissolve the lignin in the epoxy resin intermediate and cause a certain amount of reaction short of gellation to occur by heating to a temperature such as 200°–300° C. before adding the fatty acid or other linear fatty acid which is caused to react with the other components by further cooking. The following example illustrates the production of a coating wherein the lignin-epoxy resin is further modified by the inclusion of a linear monocarboxylic aliphatic acid residue.

*Example 24*

200 grams of epoxy resin intermediate having a molecular weight of the order of 350–400 was heated to 180° C. and 50 grams of free alkali lignin was added and immediately dissolved. The resulting solution was heated to 275° C. and that temperature maintained for five minutes in order to permit reaction to occur between the lignin and the epoxide. The reaction was regarded as having proceeded sufficiently when a viscosity increase occurred. At this point 200 grams of tall oil was added which contained about 90% by weight higher fatty acids and about 5% rosin acid. The tall oil was preheated to 250° C. and then was added to the partially reacted other components while they were at 275° C. The mixture was held at 275° C., at which temperature the components reacted until the acid number was reduced to zero, this requiring about 80 minutes. The reaction product was dissolved in sufficient xylene to provide a brushable consistency of about 54% solids after addition of 0.11% based on resin solids of cobalt and calcium naphthenate driers, and was applied to test samples consisting of glass plates and tin coated plates to form films 1.5 mils in thickness. The coating was dry to the touch in one hour.

The coated samples successfully resisted boiling water for fifteen minutes without failure and likewise resisted for a like period and without failure a 3% solution of sodium hydroxide at 72° F. The film showed no effect of the alkali solution after 10 hours, however after 24 hours blistering occurred. The film showed good flexibility, no cracks appearing when bent over a ⅛" mandrel. Shortly after removal of the films from the oven the films possessed a Sward hardness of 4. After 44 hours in air at 73° F. the Sward hardness increased to 8.

It is to be noted that epoxy resin films which will resist a 2% sodium hydroxide solution for 5 minutes are generally considered to be good and resistance to the above alkali solution for over ten minutes is considered excellent.

*Example 25*

200 grams of epoxy resin intermediate having an average molecular weight of between 350 and 400 were charged into a flask and heated to 180° C. 100 grams of free alkali lignin was added slowly and immediately went into solution. The temperature was slowly increased to 230° C. By the time the temperature had increased to 230° C. a viscosity increase was observed indicating some reaction had occurred. 375 grams of the tall oil used in Example 24 which had been heated to 250° C. were added. The temperature of the resulting solution was increased to 275° C. and maintained at that temperature for 45 minutes when an acid number was determined. The acid number was 11.

The resin was cooled, and 0.11% based on the resin solids of cobalt and calcium naphthenate driers were added. The resin was then dissolved in xylene until a varnish containing 43% solids was obtained. Glass and aluminum specimens were coated with 1.5 mil thickness of the varnish and baked at 200° F. for 16 hours.

The resulting baked film showed no effect upon 15 minutes exposure to boiling water. The resistance to 3% NaOH solution was very good. No effect was noted after 10 hours exposure. 24 hours exposure resulted in only a slight softening of the film, the metal plate being entirely protected by the film. When bent over ⅛" mandrel the film did not crack. The films had a Sward hardness of 6 after baking. The hardness did not increase on exposure to the air for 3 days.

*Example 26*

300 grams of an epoxy resin intermediate having an average molecular weight between 350 and 400 was heated to 170–180° C. and 75 grams of free alkali lignin was added slowly while maintaining the temperature. When all the lignin had been added and complete solution obtained the temperature was increased to 200° C. and maintained until a gel point of 55 seconds was obtained. (The gel point test comprises placing a drop of the reacting solution on a metal surface with a controlled temperature of 225° C. and agitating gently with a pointed instrument until a gel is obtained. The time required to obtain this gel is the gel point and is an indication of the progress of the reaction.) The lignin-epoxide solution was cooled to room temperature and a black solid mass was obtained.

62.5 grams of the cooled reaction mixture was dissolved in 50 grams Cellosolve. 7.0 grams of N,N-dimethyl benzyl amine was added as a curing agent. The resulting resin was used to coat, at 1.5 mils thickness, tin plate and glass specimens. A portion of these coatings designated A were air cured for 18 hours. Another portion, designated B, were baked at 200° F. for 1 hour.

62.5 grams of the cooled reaction mixture was also dissolved in 70 grams of Cellosolve and 25.0 grams of Versamid were added as a curing agent. Films were formed as above and a portion of the specimens, designated C, were air dried and the remaining designated D were baked at 200° F. for 20 minutes. Tests on these films are tabulated below.

| Coating | A | B | C | D |
|---|---|---|---|---|
| Hardness (Sward) | 16 | 58 | | 42 |
| Boiling Water (15 minutes) | No effect | No effect | No effect | No effect |
| Alkali Resistance (3% NaOH 72° F.) | No failure 12 hours | No failure 12 hours | | No failure 12 hours |
| Flexibility (No cracking over mandrel) | 3/16" | 3/16" | 1/8" | 1/8" |

*Example 27*

The procedure of Example 22 for reacting lignin and the epoxy resin were followed except that the reacted solution had the following composition and gel point.

Epoxy resin intermediate _____ grams__ 300
Lignin _____ do_____ 150
Gel point _____ seconds__ 45

62.5 grams of this reaction mixture were dissolved in 50 grams of Cellosolve and 7 grams of N,N-dimethyl benzyl amine were added. Films were formed according to the procedures of Example 22. Tabulated are the results of the evaluation of the film after baking at 200° F. for 20 minutes.

Hardness (Sward) _____ 36.
Alkali resistance (3% NaOH
  72° F.) _____ No effect 10 hours.
Boiling water (15 minutes) ___ Slight effect (lost adhesion on tin).

*Example 28*

The lignin-epoxy resin intermediate reaction mixture for this example was prepared using the same composition and the same procedure as in Example 23 except that as soon as the lignin dissolved in the epoxide 250 ml. of Cellosolve was added and a reflux condenser installed on the flask. The reaction was continued with refluxing of the Cellosolve until an instantaneous gel point was reached. The lignin-epoxide resin remained in solution in the Cellosolve when the reacted resin cooled. 100 grams of this solution was diluted with 20 grams of additional Cellosolve and 6.2 grams of N,N-dimethyl benzyl amine were added. Films were formed as in Example 22 and the films cured by baking for 10 minutes at 200° F. and by air curing for 18 hours. Sward hardness of the baked film was 64 while the air dry film hardness was 12. The baked film failed after 7 hours exposure to 3% NaOH. On 15 minutes exposure to boiling water the baked film pulled away from the plate. 50 grams of the reacted resin solution were diluted with 20 grams of Cellosolve and 40 grams of a polyamine curing agent (Shell Chemical Company Epon Curing Agent T-1) were added. Films were prepared as in Example 22. The Sward hardness of the film baked at 200° F. for 15 minutes was 26. Hardness by air curing for three hours was 8. The baked film showed no effects upon exposure to boiling water for 15 minutes or to 3% NaOH for 12 hours.

In addition to the foregoing, the curing properties of the lignin-epoxy resins may be taken advantage of in connection with compositions of the molding powder type. In such compositions it is desirable that the compositions be such as to become of a flowable consistency when injected into a mold under heat and pressure and the composition should become thermoset during curing. The following is an example of such a composition.

*Example 29*

200 grams of epoxy resin intermediate having an average molecular weight of between 350 and 400 were heated to 180° C. and 140 grams of free alkali lignin were added. The addition of the lignin decreased the temperature to 150° C. and at this temperature 100 grams of phthalic anhydride were added decreasing the temperatures to approximately 130° C. Shortly after complete solution was obtained the mass was quickly chilled to form a brittle solid mass. This was crushed to produce a finely divided powder and the powder subjected to a pressure of about 100 p.s.i. and a temperature of approximately 170° C. in a mold for 30 minutes. The tensile strength of this molded product was 3975 p.s.i.

In addition to the foregoing, other moldable mixtures may be made by different techniques. Thus instead of dissolving the the curing agent and quenching, the curing agent may be commingled with a solidified mutual solution of the lignin and epoxy resin, or all three of the ingredients may be used in powered form for fusion and curing in the mold. Alternatively, the lignin-phthalic anhydride half ester may be produced separately and reduced to a powder for subsequent admixture with a solid or liquid epoxy resin intermediate immediately prior to molding, or a part of the lignin may be dissolved in the epoxy resin intermediate that is mixed with the lignin-phthalic anhydride partial ester.

In addition to using polycarboxylic acid curing agents other curing agents and catalysts of the kinds hereinabove disclosed may be utilized in molding powder compositions.

In connection with products such as those illustrated hereinabove, the description has referred to compositions consisting essentially of the new lignin-epoxy resin. However, the resin may be used in conjunction with other materials. Thus a number of different solid materials may be incorporated as fillers or extenders or for imparting added strength characteristics in the case of fibers. Thus a variety of inorganic filler materials such as pigments, clays, sand and the like may be admixed with the resin, or organic fillers may similarly be used such as wood flour, powered hard resin scrap and the like. Fiber of substantial length may likewise be incorporated which may be organic such as wood fiber, cotton, organic synthetics or the like, or may be mineral such as asbestos or glass fiber.

The following example using titanium dioxide as a pigment illustrates that the dark color of the lignin-epoxy resins can be modified somewhat.

*Example 30*

To 20 grams of epoxy resin intermediate having an average molecular weight of between 350 and 400, 5 grams of free alkali lignin was added. The mixture was heated to 180° C. and a solution was formed. At 180° C. 5 grams of $TiO_2$ was added reducing the temperature to 140° C. At this temperature 20 grams of phthalic anhydride and 0.5 gram of a polyamine were added. The resulting mixture was poured into a mold and cured at 300° F. for 30 min. A medium tan thermoset material was obtained. No physical tests were made on this cast piece.

The following illustrates the use of polysulfides as a flexibilizer in lignin epoxy resins.

*Example 31*

10 grams of a polysulfide (sold under the designation Thiokol EM 207) were added to 20 grams of an epoxy resin intermediate having an average molecular weight of between 350 and 400 and the mixture warmed. 5 grams of free alkali lignin were added and the mixture heated to 220° C. before solution was obtained. The solution was cooled to 130° C. and 9 grams of phthalic anhydride were added and immediately dissolved. The solution was poured into an aluminum tray and cured at 300° F. for 1½ hours. A very tough slightly flexible piece was thus obtained.

In addition to the foregoing, there may be used with the new resin of this invention many of the plasticizers, flexibilizers or other modifiers which are commonly used with epoxy resins such as epoxidized vegetable oils, polyamide resins, polysulfides and fatty diamines.

According to this invention, lignin has been successfully caused to enter into the molecular structure of a new synthetic resin having useful and valuable properties. To the extent that useful properties may be afforded by effecting chemical linkage between lignin and a poly-oxirane epoxide compound, it is normally advantageous from the cost standpoint to do so, inasmuch as the cost of lignin is little more than that of a waste product while the cost of epoxy resin intermediates at the present time is relatively high in comparison with the components used in a number of other synthetic resins. However, to the extent that an appreciable amount of lignin becomes dissolved in the poly-oxirane epoxide compound and is caused to enter into chemical condensation reaction, there is utilization of this invention to a corresponding extent. Usually the lignin ranges from about 5% to about 50% and preferably about 20% to about 50% of the combined weight of the lignin and the poly-oxirane epoxide compound. However, as has been pointed out above, this is not to say that the poly-oxirane epoxide compound may not constitute a minor proportion of the components going into the cured resin, for, as in the case of a curing agent such as phthalic acid or other polycarboxylic acid, synthetic resins having a very high order of properties may be produced when the lignin and the polycarboxylic acid constitute the major proportion of the components which react to form the resin. It is to be understood, however, that this invention is not limited to employment of lignin in minor proportion relative to the poly-oxirane epoxide compound, for, to the extent that the lignin may be caused to go into mutual solution with the poly-oxirane epoxide compound, linkage by chemical reaction may be accomplished to a substantial extent and it is not always necessary to develop optimum strength characteristics. For example, in shell molding where little strength is required, economies from the standpoint of using large proportions of lignin may be effected notwithstanding that optimum strength characteristics are not developed. By the following method, up to 10 parts of free alkali lignin were found to form a solution with 1 part of epoxy resin intermediate. Lignin was ground with an epoxy resin intermediate having an average molecular weight of approximately 300 (diglycidyl ether of glycerol) with a mortar and pestle and the powder thus obtained placed between glass microscope slides. The slides were heated to 400° F. while the slides were held tightly together. The proportion of lignin which may be induced to go into mutual solution with the poly-oxirane epoxide compound may be promoted by heating up to the temperature of chemical degradation of the lignin. Moreover, the amount of lignin which may be induced to go into solution with the poly-oxirane epoxide compound may be promoted by the employment of common solvents of the character hereinabove mentioned, which may be either volatile or substantially non-volatile, or may be reactive during curing to go into the resin molecule. Thus mutual solutions may be obtained wherein the percent of lignin in relation to the epoxy resin is essentially unlimited.

While free lignin recovered from an alkaline pulping operation has the high order of solubility with poly-oxirane epoxide compounds hereinabove mentioned, an increase in the proportion of inorganic components results in decreased solubility, with the result that a lignin in the form of a salt has such limited solubility as not to have utility for use according to this invention. In this connection, it is the solubility which is the important factor. Accordingly, to the extent that a given lignin is soluble to a practically significant extent in a composition containing a poly-oxirane epoxide compound so that the epoxide compound and the lignin go into mutual solution, the conditions are such as to enable the practice of this invention whereby condensation reaction may be effected as has been described hereinabove. Thus a type of the lignin which is referred to as "Rheinau" lignin and which is obtained as a by-product of the production of wood sugars from natural ligno-cellulose material utilizing mild hydrochloric acid has relatively low solubiity in epoxy resin intermediates but may be employed to the extent that solution may be effected.

The following example illustrates the limited utility of "Rheinau" lignin in this invention.

*Example 32*

50 grams of an epoxy resin intermediate having an average molecular weight of between 350 and 400 were heated to 180° C. and 17.5 grams of "Rheinau" lignin were added. Not all the lignin appeared to go into solution. The temperature was reduced to 130° C. and 33 grams of phthalic anhydride were added. The mixture was poured into molds and cured at 160° C. for 45 minutes and at 106° C. for 20 hours. Visual observation of these cast pieces indicated that very little of the lignin has dissolved. The top of these pieces contained about 1/16 inch of a brownish powder presumed to be lignin. Flexural strength of the pieces was approximately 2600 p.s.i. Observation of the area at which fracture occurred indicated that some of the lignin had dissolved in the resin.

Sulphite lignin, which is a by-product of pulping natural ligno-cellulose material with bisulphite and sulphur dioxide, occurs in the form of a lignin sulphonic acid salt which is precipitated with alkali for effecting its recovery. Such lignin sulphonate compounds do not possess the attribute of solubility in epoxy compounds such as poly-oxirane epoxy resin intermediates. However, this is not to preclude the possibility of chemically treating sulphite lignin so as to eliminate the inorganic material and convert the lignin to a form having the property of going into mutual solution with a poly-oxirane epoxide compound such as an epoxy resin intermediate.

The proportion of curing agent that is employed varies substantially with (*a*) the type of curing agent employed (*b*) the amount of lignin employed and (*c*) the type of epoxy resin intermediate employed. Thus, when a curing agent of the polycarboxylic acid type is employed, the amount may vary from only an appreciable amount up to the theoretical amount required for reaction with the lignin and epoxy resin intermediate. However, in compositions containing such curing agents, it is usually desirable that the dicarboxylic acid or anhydride constitute from 0.3 to 2.5 moles per mole of the combined moles of lignin and epoxy resin intermediates present based on the lignin having an assumed molecular weight of 1000. This range includes the amount theoretically required for reaction with the epoxy resin intermediate alone and the amount required for reaction with the epoxy resin intermediate plus the lignin although somewhat less than the amount for reaction with both the lignin and the epoxy resin intermediate is generally used. When the curing agent is of the amine type, the amount usually runs somewhat less and since it generally undesirable to have reaction occur between the lignin and amine directly, the amount of amine curing agent is preferably less than about 25% of the weight of the epoxy resin intermediate. This may vary, however, due to the use of primary, secondary, tertiary or amide type amine curing agents. In this connection, substances which are sometimes referred to as activators or catalysts are, in effect, curing agents that are highly effective even in small relative amounts and for this reason in the claims the term "curing agent" is employed in a broad sense as including substances that sometimes likewise are referred to as activators or catalysts.

Polyamide compounds may also be used as curing agents in this invention and are to be considered as an amine curing agent. The following example illustrates further the use of a polyamide in curing a lignin-epoxy resin.

Example 33

5 grams of free alkali lignin were heated with 20 grams of an epoxy resin intermediate having an average molecular weight of between 350 to 400 and heated to 180° C. and a solution formed. The solution was cooled to 120° C. and 5 grams of a polyamide, (sold under designation of Versamid 140) was added and dissolved. This solution was poured into an aluminum tray and cured at 300° F. After 5 minutes the resin had set. Moisture resistance of the resin was 0.109%.

The curing conditions employed are generally comparable to those required for curing epoxy resins. In some cases, curing can be accomplished at atmospheric temperatures and pressure. However, curing ordinarily is induced by heat up to about 300° C. However, in coating compositions containing a substantial proportion of unsaturated fatty acid residue, drying occurs principally by oxidation.

It has been pointed out that during curing with a curing agent such as phthalic acid, the phthalic acid reacts with a hydroxyl comprised in the lignin to form a partial ester whose residual carboxyl in turn reacts with an epoxy group of an epoxy compound. In many instances, it is desirable prior to curing with the epoxy compound to initially effect partial esterification between lignin and a polycarboxylic acid such as phthalic acid to form a partial ester. To the extent that this action involves esterification with formation of water, the water may be produced in the pre-reaction and removed prior to dissolving the lignin partial ester with an epoxy compound such as an epoxy resin intermediate.

Example 34

200 grams of phthalic anhydryde were melted and 200 grams of oven dry free alkali lignin were added and dissolved. The temperature was raised to 140° C. and maintained for 1 hour. Analyses indicated that 1.89 moles of phthalic anhydryde had reacted with one mole of lignin having an assumed molecular weight of 1000 and that 2.1 moles of phthalic anhydryde per mole of lignin remain unreacted. The lignin phthalate ester and phthalic anhydryde solution was cooled and ground to a powder. 20 grams of the powdered ester and phthalic anhydryde were added to 20 grams of a poly-oxirane epoxy resin intermediate having an average molecular weight between 350 and 400 and heated to 140° C. and a mutual solution was obtained. This solution was poured into an aluminum tray and cured at 300° F. for 30 minutes. The water resistance of the cured piece was 0.047%. The cured piece exhibited good strength and toughness.

It is also possible to treat the lignin with a compound which results either in an ester or an ether wherein the added radical does not contain a hydrogen atom reactive with an oxirane group of an epoxide compound. However, such treatment should not exhaust the reactive hydroxyl or carboxyl groups of the lignin molecule; but so long as these groups are not exhausted some of them may be caused to combine with formation of a lignin ester or ether product. To the extent that such non-reactive radicals are added, the reactivity of the lignin for becoming chemically linked with a poly-oxirane epoxide compound is diminished. Nevertheless, formation of such ester or esthers usually modifies the viscosity characteristics of the lignin when incorporated with a poly-oxirane epoxide compound and where such modification is desired the esters may be produced by reaction with organic acids such as acetic acid. For example, it has been mentioned hereinabove in connection with the preparation of coating compounds that the lignin may be esterified with linear aliphatic monocarboxylic acids for the purpose of imparting greater flexibility and toughness to the coating. As regards ethers, the lignin may be modified by reaction with substances such as benzyl chloride or diethyl sulphate. The following is an example illustrative of the practice of this invention using a lignin ether.

Example 35

25 grams of a lignin ether prepared by reacting lignin with benzyl chloride were dissolved in 52 grams of epoxy resin intermediate having an average molecular weight between about 350 and 400 and 34.4 grams of phthalic anhydride. 0.5 gram of a polyamine accelerator also was added. The casting and curing were effected as in Example 1 and the resulting resin had a flexural strength of 8,200 p.s.i. Impact strength was 0.417 ft. per inch and water resistance was 0.0532%.

As hereinabove stated, the methoxy group content in lignin is relatively inert and does not appear to enter into the resin-forming reaction and, this being the case, the methoxy radical content of the lignin is largely immaterial. However, it is possible to wholly or partially remove methyl groups from the lignin molecule with complete or partial replacement of correspondingly positioned hydroxyls and to employ the demethylated lignin in the practice of this invention.

The following example illustrates the employment of demethylated lignin:

Example 36

17 grams of demethylated lignin, 49.7 grams of epoxy resin intermediate having a molecular weight between 350 and 400 and 38.2 grams of phthalic anhydride were brought into mutual solution and were cast and cured at 160° C. for 45 minutes and 136° C. for 20 hours. The resulting resin had a flexural strength of 7,400 p.s.i. and a water resistance of 0.0507%.

The foregoing is illustrative of the fact that so long as the reactive hydroxyl groups or the carboxyl groups of lignin are retained to a substantial extent, chemical linkage directly or indirectly with a poly-oxirane epoxide compound may be effected according to this invention and the term "lignin" as used herein embraces such lignin substances.

Hereinabove principal consideration has been given to the cured resin and the method of producing the cured resin in the practice of this invention. However, in the production of such resins the producer of the finished resin product generally obtains the resin components from suppliers thereof and the present invention also relates to commercial products prepared for sale and eventual use in the manufacture of the finished cured resin products. Thus, the resin-forming component, as distinguished from the curing agent, may be supplied in the form of an intimate combination of lignin and a poly-oxirane epoxide compound such as an epoxy resin intermediate. The intimate combination may be either in the form of a mutual solution prepared either by heating a mixture of lignin and epoxy resin intermediate until they go into solution or by producing the mutual solution with the aid of a common solvent of the volatile or non-volatile or reactive type or by a combination of these expedients. On the other hand, the lignin in its normal amorphous powdered condition may be placed in intimate combination by its physical admixture with an oxirane epoxide compound which may be either fluid or solid, depending on its molecular weight, the mutual solution becoming effected during the ultimate curing. Moreover, such intimate combinations of the lignin and the oxirane epoxide compound may be further combined with a curing agent, when the curing agent is so combined with the other components does not result in premature reaction. For example, the lignin and epoxy resin intermediate may be partially cured so as to produce a material solid at normal temperatures and the resultant solid material may then be mixed in finely divided condition with a curing agent such as phthalic anhydride. On the other hand, as hereinabove described in connection with Example 25, lignin, an epoxy resin intermediate and curing agent may be brought into mutual solution which is quenched to room temperature to minimize premature curing, with the result that the composition without more may be caused to become thermoset merely by application of heat and pressure.

While this invention has been described in connection with various examples and specific ways of practicing this invention, it is to be understood that this has been done for the purposes of illustration and that the practice of this invention may be varied within the scope of the principles employed in the practice thereof as hereinabove set forth.

We claim:

1. A method of making a synthetic resinous reaction product which comprises reacting alkali lignin with an oxirane epoxide while said alkali lignin and said oxirane epoxide are in mutual solution, said lignin constituting at least about 5% of the combined weight of said lignin and said epoxide.

2. A method of making a synthetic resinous reaction product which comprises reacting alkali lignin with a poly-oxirane epoxide having a molecular weight between about 80 and about 4000 while said lignin and said epoxide are in mutual solution, said lignin constituting at least about 5% of the combined weight of said lignin and said epoxide.

3. A method according to claim 2 wherein said reaction is effected while said solution is heated and is continued while said solution is heated until the reaction product becomes thermoset.

4. A method of making a synthetic resinous reaction product which comprises reacting alkali lignin directly with a poly-oxirane epoxide while said lignin and said epoxide are in mutual solution, said alkali lignin constituting at least about 5% of the combined weight of said lignin and said epoxide.

5. A method of making a synthetic resinous reaction product which comprises reacting alkali lignin with a poly-oxirane epoxide while said lignin and said epoxide are in mutual solution in the presence of a polycarboxylic curing agent contained in said solution, said lignin constituting at least about 5% of the combined weight of said lignin and said epoxide.

6. A method of making a synthetic resinous reaction product which comprises first reacting alkali lignin with a polycarboxyl compound to produce a reaction product containing a residual carboxyl group and thereafter reacting said reaction product with a poly-oxirane epoxide while said reaction product and said epoxide are in mutual solution, said lignin being at least about 5% of the combined weight of said lignin and said epoxide.

7. A method of making a synthetic resinous reaction product which comprises reacting alkali lignin with a poly-oxirane epoxide having a molecular weight between about 80 and about 4000 while said lignin and said epoxide are in mutual solution in the presence of an amine, said lignin constituting at least about 5% of the combined weight of said lignin and said epoxide.

8. A method of making a synthetic resinous reaction product which comprises reacting alkali lignin with a poly-oxirane epoxide while said lignin and said epoxide are in mutual solution wherein said lignin constitutes at least about 5% of the combined weight of said lignin and said epoxide, and esterification of the reaction product with a monocarboxylic acid containing from 18 to 26 carbon atoms.

9. A product of chemical reaction in mutual solution between alkali lignin and a poly-oxirane epoxide, said lignin constituting at least about 5% of the combined weight of said lignin and said epoxide.

10. A resinous product of chemical reaction between alkali lignin and a poly-oxirane epoxide in mutual solution in the presence of a polycarboxylic curing agent, said alkali lignin constituting at least about 5% of the combined weight of said lignin and said epoxide.

11. A resinous product of chemical reaction according to claim 10 wherein said lignin constitutes from about 20% to about 50% of the combined weight of said lignin and said epoxide in said mutual solution, wherein the combined weight of said lignin and said curing agent is substantially greater than the weight of said epoxide, wherein said curing agent is present in an amount that is in excess of that theoretically required for reaction with said epoxide and that is less than the theoretical amount required for reaction with said acid plus said lignin, wherein said poly-oxirane epoxide has a molecular weight between about 300 and about 4000, and wherein said polycarboxylic curing agent is a dicarboxylic acid.

12. A resinous product of chemical reaction between alkali lignin and a poly-oxirane epoxide in mutual solution in the presence of an amine curing agent, said alkali lignin constituting at least about 20% of the combined weight of said lignin and said epoxide.

13. A body having applied to the surface thereof a coating comprising a resin product of chemical reaction between alkali lignin, a poly-oxirane epoxide and a monocarboxylic acid containing from 18 to 26 carbon atoms, said lignin constituting at least about 5% of the combined weight of said lignin and said epoxide.

14. A product comprising alkali lignin and a poly-oxirane epoxide in mutual solution, said lignin constituting at least about 5% of the combined weight of said lignin and said epoxide.

15. A product comprising in intimate combination a poly-oxirane epoxide and alkali lignin having substantial solubility in said epoxide, said lignin constituting at least about 5% of the combined weight of said lignin and said epoxide.

References Cited in the file of this patent

UNITED STATES PATENTS

| | | |
|---|---|---|
| 1,750,903 | Phillips | Mar. 18, 1930 |
| 2,404,840 | Harvey | July 30, 1946 |
| 2,437,955 | Hersh | Mar. 16, 1948 |
| 2,723,241 | De Groote et al. | Nov. 8, 1955 |
| 2,802,023 | Fenske et al. | Aug. 6, 1957 |
| 2,809,184 | Langer | Oct. 8, 1957 |
| 2,886,472 | Condo et al. | May 12, 1959 |
| 3,093,604 | Ayers | June 11, 1963 |

OTHER REFERENCES

"Fibers From Lignin," Chemical and Engineering News, Apr. 15, 1957, page 29.